United States Patent Office 3,532,762
Patented Oct. 6, 1970

3,532,762
HYDROCARBON AND A PROCESS FOR THE MANUFACTURE THEREOF
Bernard Pierre Corbier and Paul Jose Teisseire, Grasse, France, assignors to Societe Anonyme des Établissements Roure-Bertrand Fils & Justin Dupont, Grasse, France, a corporation of France
No Drawing. Filed Feb. 28, 1968, Ser. No. 713,561
Claims priority, application Switzerland, Mar. 15, 1967, 3,840
Int. Cl. C07c 5/00, 11/02
U.S. Cl. 260—677                                    4 Claims

ABSTRACT OF THE DISCLOSURE

A process for the preparation of an undecatriene hydrocarbon of the formula $$CH_3-(CH_2)_4-CH=CH-CH=CH-CH=CH_2$$

which comprises subjecting to pyrolysis a compound of the formula:

---

This invention is concerned with a process for the manufacture of an undecatriene hydrocarbon of the formula:

$$CH_3-(CH_2)_4-CH=CH-CH=CH-CH=CH_2 \quad \text{I}$$

especially of the novel di-cis isomer of such an undecatriene, i.e. of undecatriene-1,3(cis), 5(cis) which is distinguished by particularly valuable odorant properties (galbanum odor) and accordingly is suitable for use as odorant. The invention is further concerned with scented compositions containing the said di-cis isomer as olfactory agent.

The process according to the invention comprises subjecting to pyrolysis a compound of the general Formula II (preferably the 5-cis isomer thereof)

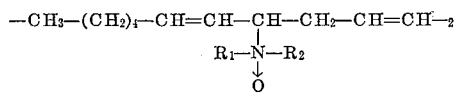

wherein $R_1$ and $R_2$ are each a lower alkyl or aryl group (especially each a methyl group).

Preferably the compounds of Formula II are produced from an undecenynol of Formula VI according to the following reaction scheme:

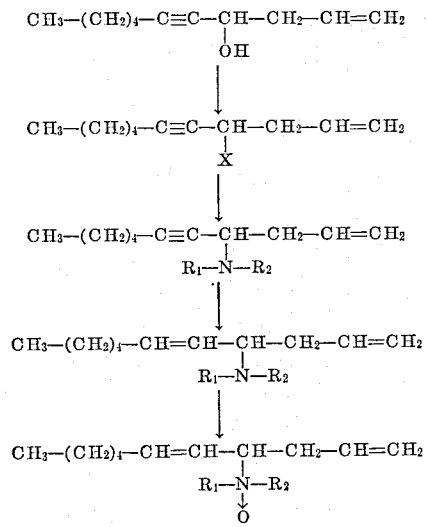

In these formulae, $R_1$ and $R_2$ have the above meanings. X is a halogen atom (especially a bromine or chlorine atom) or an easily aminolysable esterified hydroxy group (e.g. a hydroxy group which is esterified by an aliphatic or aromatic sulfonic acid such as the mesyloxy or toxyloxy group).

The conversion of a compound of Formula VI into one of Formula II can be undertaken according to methods which are known per se.

The replacement of the hydroxyl group of the alcohol VI by a halogen atom to produce a halogen compound V can be carried out in conventional manner by treatment of the alcohol VI with a halogenating agent such as, for example, phosphorus tribromide in the presence of a solvent such as benzene at reflux temperature.

The exchange of the X-substituent of the compound V for the amino group $NR_1R_2$ to produce the tertiary amine IV can likewise be effected in conventional manner by treatment of the compound V with a secondary amine $HNR_1R_2$, if desired in the presence of a solvent such as benzene.

The partial hydrogenation of the acetylenic bond of the compound IV to produce the diene III can be carried out in the presence of a selectively active hydrogenation catalyst such as the so-called Lindlar catalyst (a palladium catalyst partially deactivated with lead, with which triple bonds can be hydrogenated without affecting double bonds present in the starting compound or resulting during the hydrogenation), for example, in the presence of a palladium/calcium carbonate catalyst partially deactivated with lead (see Helvetica Chimica Acta, 1952, 35, 446). As the main product of this catalytic partial hydrogenation there is obtained a diene having 5-cis configuration.

The oxidation of the amine III to produce the amine oxide II can be effected according to known methods, conveniently by treatment of the amine III with excess aqueous hydrogen peroxide (e.g. 30%) at temperatures between about $-10°$ and room temperature.

The excess hydrogen peroxide may be decomposed after completion of the reaction, for example, by addition of platinum oxide. After filtration of the platinum oxide and concentration of the solution, conveniently at temperatures not above 40° C., the amine oxide II can be subjected to pyrolysis in crude form.

The pyrolysis of the amine oxide II to produce a triene I can be carried out with or without a solvent at temperatures up to about 160° C. (e.g. between about 100 and 150° C.), conveniently under reduced pressure (e.g. at about 5–25 mm. Hg.). As solvents, there can be used for example: lower alkanols such as methanol; cyclic ethers such as dioxan or tetrahydrofuran; dimethyl sulfoxide; or mixtures of such solvents with water (for example, mixtures of water with tetrahydrofuran or dimethyl sulfoxide).

The compounds of Formula I, especially the undecatriene-1,3(cis), 5(cis) isomer, can be used in perfumery by virtue of the characteristic galbanum odor. For this purpose, the olfactory agents may be incorporated in perfume-containing compositions in conventional manner.

In the following examples, the temperatures are given in degrees centigrade.

EXAMPLE 1

(a) 7 g. of pyridine are added to 70.5 g. (0.425 mol) of undecen-1-yn-5-ol-4. The mixture obtained is added in the course of 1 hour to a solution of 0.156 mol of phosphorus tribromide and 0.8 ml. of pyridine in 425 ml. of anhydrous benzene and then heated to reflux. After the usual working up there are obtained 86 g. of a crude product from which, after rectification under 1 mm., there are obtained 60 g. of 4-bromo-undecen-1-yne-5 (yield 62%). Boiling point 75–78°/1 mm.

(b) 60 g. (0.26 mol) of 4-bromo-undecen-1-yne-5 are added to a solution of 35 g. (0.78 mol) of dimethylamine in 250 ml. of benzene. A precipitate immediately forms. The mixture is allowed to stand at room temperature for 72 hours, the precipitate of dimethylamine hydrobromide which is formed is separated off and washed with benzene. The benzene solutions are washed several times with 10% hydrochloric acid and with water for the purpose of extracting the 4-dimethylamino-undecen-1-yne-5 which is formed. The acidic solutions containing the hydrochloride of the said amine are treated with an excess of 10 N soda solution and exhaustively extracted with diethyl ether. After the usual working up there are finally obtained 28 g. of 4-dimethylamino-undecen-1-yne-5 (yield 55.8%).

(c) The 4-dimethylamino-undecen-1-yne-5 obtained is dissolved in petroleum ether and hydrogenated in the presence of Lindlar catalyst. There is obtained 4-dimethylamino-undecadiene-1,5(cis) in a yield of at least 80%.

Infrared spectrum:

$\nu$(C—N) at 1041 cm.$^{-1}$
$\nu$(C=C) at 1639 cm.$^{-1}$
$\gamma$(—CH=CH$_2$) at 910 and 992 cm.$^{-1}$
$\gamma$(—CH=CH—cis) at 676 cm.$^{-1}$ (d) 0.15 mol of hydrogen peroxide (i.e. 27 ml. of a 22 N solution) are added with stirring at a temperature between 0 and —5° in the course of 30 minutes to 10.5 g. (0.054 mol) of 4-dimethylamino-undecadiene-1,5(cis). The mixture is allowed to reach room temperature in the course of approximately 3 hours and is then allowed to stand for 16 hours with constant stirring. There is thus obtained a homogeneous solution. The excess H$_2$O$_2$ is decomposed by means of the addition of small amounts of platinum oxide within 6 hours. The platinum oxide is thereupon removed by filtration. The aqueous solution obtained is concentrated under reduced pressure at a temperature not above 40°. There are obtained 12 g. of crude N-oxide of 4-dimethylamino-undecadiene-1,5(cis).

(e) 12 g. of crude N-oxide of 4-dimethylamino-undecadiene-1,5(cis) are heated at temperatures of 100 to 150° under 5 mm. pressure. There is obtained a distillate of 6.6 g. which is taken up in petroleum ether. The petroleum ether solution is washed with dilute hydrochloric acid, with bicarbonate solution and with water and then dried. After distillation there are obtained 5.5 g. of crude undecatriene-1,3,5. Yield 82% (based on 4-dimethylamino-undecen-1-yne-5). The triene obtained, which exhibits a very strong galbanum odor, substantially consists of the di-cis isomer, i.e. undecatriene-1,3(cis), 5(cis). The product thus obtained is already sufficiently pure for perfumery purposes.

An analytically pure product can be obtained by purifying the triene as follows: The triene (5.5 g.) is filtered over a column of 12 g. of silicagel and eluted with petroleum ether. The eluted product is finally further purified by means of preparative gas chromatography.

Ultraviolet spectrum:

$\lambda_{max}$=257 m$\mu$   $\epsilon_{max}$=57400
$\lambda_{max}$=266 m$\mu$   $\epsilon_{max}$=77800
$\lambda_{max}$=277 m$\mu$   $\epsilon_{max}$=60000

EXAMPLE 2

A scented composition containing undecatriene-1,3 (cis), 5(cis) can, for example, be made up as follows:

|  | G. |
|---|---|
| Lemon oil | 100 |
| Petit-grain oil | 50 |
| Guiac wood oil | 50 |
| Araucaria oil | 50 |
| Orange oil terpenes | 50 |
| Jasmine oil (absolute) | 50 |
| Rose oil (absolute) | 20 |
| Orange blossom oil (absolute) | 50 |
| Hydroxycitronellal | 150 |
| Citral | 50 |
| Undecatriene-1,3(cis), 5(cis) | 2 |
| Enol ether of tetramethylacetylcyclohexanone | 78 |
| Diethyl phthalate | 300 |

We claim:

1. A process for the manufacture of an undecatriene hydrocarbon of the formula:

$$CH_3—(CH_2)_4—CH=CH—CH=CH—CH=CH_2 \quad I$$

which comprises subjecting to pyrolysis a compound of the formula:

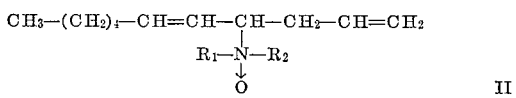

wherein R$_1$ and R$_2$ are each a lower alkyl or aryl group.

2. A process according to claim 1, wherein the 5-cis isomer of a compound of Formula II is used.

3. A process according to any one of claims 1 and 2, wherein R$_1$ and R$_2$ each are a methyl group.

4. A process according to any one of claims 1 to 3, wherein the compound of Formula II is prepared by reacting an alcohol of the formula

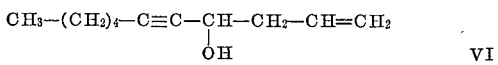

with a halogenating or esterifying agent to produce a compound of the formula:

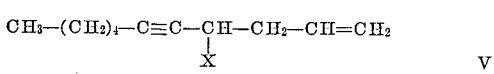

wherein X is a halogen atom or an esterified hydroxy group, reacting the obtained compound with an amine of the general formula:

wherein R$_1$ and R$_2$ have the above meaning, to form an amine of the general formula:

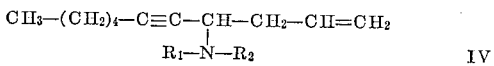

wherein R$_1$ and R$_2$ have the above meaning, catalytically hydrogenating said amine to a compound of the general formula:

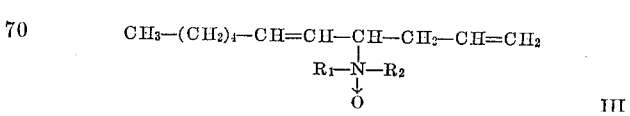

wherein R$_1$ and R$_2$ have the above meaning, and oxidising the hydrogenation product to the corresponding N-oxide of formula:

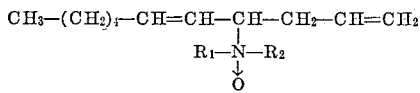

II wherein $R_1$ and $R_2$ have the above meaning.

References Cited
UNITED STATES PATENTS

| | | | |
|---|---|---|---|
| 3,441,629 | 4/1969 | Zuech | 260—683.2 |
| 2,946,829 | 7/1960 | Likins et al. | 260—677 |
| 2,355,314 | 8/1944 | McCorkle | 260—682 |
| 2,809,216 | 10/1957 | Inhoffen | 260—601 |

OTHER REFERENCES

Journal Amer. Chem. Society vol. 74, issue 2 pp. 509–11, published Jan. 20, 1952 Smith et al. "The Competitive Formation of Different Olefins from Quaternary Amines."

"Nonterpenic Skeleton Hydrocarbon Isolated from Galbanum Oil" Chretien-Bressiere et al. Bull. Soc. Chim. Fr. 1967(1), 97–8(Fr.).

DELBERT E. GANTZ, Primary Examiner

J. M. NELSON, Assistant Examiner